(12) United States Patent
Sheh (10) Patent No.: US 7,457,071 B1
(45) Date of Patent: Nov. 25, 2008

(54) LOCATING AN INITIAL SERVO TRACK IN ORDER TO SERVO WRITE A DISK DRIVE FROM SPIRAL TRACKS

(75) Inventor: Edgar D. Sheh, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 121 days.

(21) Appl. No.: 11/500,568

(22) Filed: Aug. 8, 2006

(51) Int. Cl.
*G11B 21/02* (2006.01)
*G11B 5/09* (2006.01)
*G11B 5/596* (2006.01)

(52) U.S. Cl. ................... 360/75; 360/48; 360/77.08
(58) Field of Classification Search ............. None
See application file for complete search history.

(56) References Cited

U.S. PATENT DOCUMENTS

| | | |
|---|---|---|
| 5,576,906 A | 11/1996 | Fisher et al. |
| 5,668,679 A | 9/1997 | Swearingen et al. |
| 5,754,353 A | 5/1998 | Behrens et al. |
| 5,761,212 A | 6/1998 | Foland, Jr. et al. |
| 5,831,888 A | 11/1998 | Glover |
| 6,021,012 A | 2/2000 | Bang |
| 6,023,386 A | 2/2000 | Reed et al. |
| 6,091,564 A | 7/2000 | Codilian et al. |
| 6,249,896 B1 | 6/2001 | Ho et al. |
| 6,292,318 B1 | 9/2001 | Hayashi |
| 6,304,407 B1 | 10/2001 | Baker et al. |
| 6,411,453 B1 | 6/2002 | Chainer et al. |
| 6,429,989 B1 | 8/2002 | Schultz et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,603,622 B1 | 8/2003 | Christiansen et al. |
| 6,704,156 B1 | 3/2004 | Baker et al. |
| 6,738,205 B1 | 5/2004 | Moran et al. |
| 6,985,316 B1 | 1/2006 | Liikanen et al. |
| 7,054,083 B2 | 5/2006 | Ehrlich |
| 7,088,533 B1 | 8/2006 | Shepherd et al. |
| 7,330,327 B1 * | 2/2008 | Chue et al. ............. 360/75 |
| 2007/0285822 A1 * | 12/2007 | Lau ....................... 360/69 |

* cited by examiner

*Primary Examiner*—Joseph Feild
*Assistant Examiner*—Jason Olson
(74) *Attorney, Agent, or Firm*—Howard H. Sheerin, Esq.

(57) ABSTRACT

An embodiment of the present invention comprises a method of writing product servo sectors to a disk of a disk drive. The disk comprises a plurality of spiral tracks each having a high frequency signal interrupted at a predetermined interval by a sync mark. The head internal to the disk drive is used to read the spiral tracks to generate a read signal which is processed to detect the sync marks. An aberration is detected in the detected sync marks in order to locate an initial radial location of the head with respect to the disk. The read signal representing the high frequency signal in the spiral tracks is processed to generate a position error signal (PES) used to maintain the head along a substantially circular target path while using the head internal to the disk drive to write the product servo sectors along the circular target path.

10 Claims, 10 Drawing Sheets

LOCATING AN INITIAL SERVO TRACK IN ORDER TO SERVO WRITE A DISK DRIVE FROM SPIRAL TRACKS

BACKGROUND OF THE INVENTION

1. Field of the Invention

The present invention relates to disk drives for computer systems. More particularly, the present invention relates to locating an initial servo track in order to servo write a disk drive from spiral tracks.

2. Description of the Prior Art

Figure 1:
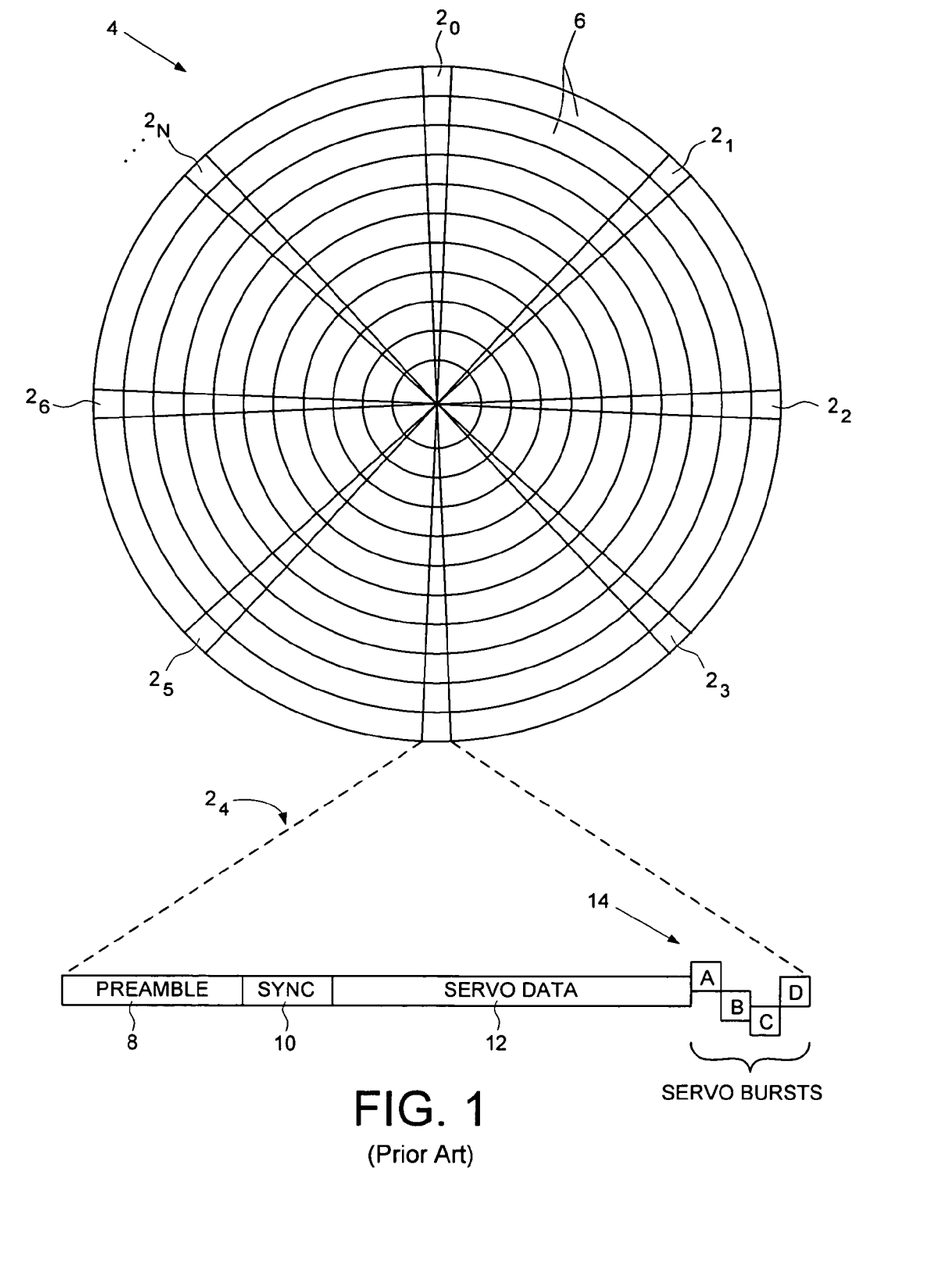
FIG. 1 shows a prior art disk format comprising a plurality of radially spaced, concentric tracks defined by a plurality of product servo sectors.

When manufacturing a disk drive, product servo sectors $2_0$-$2_7$ are written to a disk 4 which define a plurality of radially-spaced, concentric data tracks 6 as shown in the prior art disk format of FIG. 1. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation the servo bursts 14 are processed by the disk drive in order to maintain a head over a centerline of a target track while writing or reading data. In the past, external servo writers have been used to write the product servo sectors $2_0$-$2_7$ to the disk surface during manufacturing. External servo writers employ extremely accurate head positioning mechanics, such as a laser interferometer, to ensure the product servo sectors $2_0$-$2_7$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks.

The '679 patent rotates an actuator arm until it contacts an outer diameter (OD) crash stop in order to position the head over an initial servo track at the beginning of the servo writing operation. However, utilizing an OD crash stop to locate the initial servo track may be undesirable for a number of reasons, including the loss of available recording area, or impracticality, such as in disk drives that employ ramp loading/unloading.

SUMMARY OF THE INVENTION

An embodiment of the present invention comprises a method of writing product servo sectors to a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk. The disk comprises a plurality of spiral tracks, wherein each spiral track comprises a high frequency signal interrupted at a predetermined interval by a sync mark. The head internal to the disk drive is used to read the spiral tracks to generate a read signal, and the read signal is processed to detect the sync marks in the spiral tracks. An aberration is detected in the detected sync marks in order to locate an initial radial location of the head with respect to the disk. The read signal representing the high frequency signal in the spiral tracks is processed to generate a position error signal (PES) used to maintain the head along a substantially circular target path while using the head internal to the disk drive to write the product servo sectors along the circular target path.

In one embodiment, at least one of the spiral tracks is missing at least one sync mark at the initial radial location, and in one embodiment, every other spiral track is missing at least one sync mark at the initial radial location.

In another embodiment, the sync marks comprise a first pattern at the initial radial location, and the sync marks comprise a second pattern at radial locations different than the initial radial location, wherein the first pattern is different than the second pattern. In one embodiment, detecting the sync marks comprises detecting the first pattern at the initial radial location and detecting the second pattern at radial locations different than the initial radial location.

Another embodiment of the present invention comprises a disk drive comprising a disk including a plurality of spiral tracks, wherein each spiral track comprises a high frequency signal interrupted at a predetermined interval by a sync mark. The disk drive further comprises an actuator arm, a head connected to a distal end of the actuator arm, and a voice coil motor for rotating the actuator arm about a pivot to position the head radially over the disk. Control circuitry within the disk drive writes a plurality of product servo sectors to the disk to define a plurality of radially spaced, concentric data tracks. The head internal to the disk drive is used to read the spiral tracks to generate a read signal which is processed to detect the sync marks in the spiral tracks. An aberration is detected in the detected sync marks in order to locate an initial radial location of the head with respect to the disk. The read signal representing the high frequency signal in the spiral tracks is processed to generate a position error signal (PES) used to maintain the head along a substantially circular target path while using the head internal to the disk drive to write the product servo sectors along the circular target path.

DESCRIPTION OF THE PREFERRED EMBODIMENTS

An embodiment of the present invention comprises a method of writing product servo sectors to a disk of a disk drive. The disk comprises a plurality of spiral tracks, wherein each spiral track comprises a high frequency signal interrupted at a predetermined interval by a sync mark. The head internal to the disk drive is used to read the spiral tracks to generate a read signal, and the read signal is processed to detect the sync marks in the spiral tracks. An aberration is detected in the detected sync marks in order to locate an initial radial location of the head with respect to the disk. The read signal representing the high frequency signal in the spiral tracks is processed to generate a position error signal (PES) used to maintain the head along a substantially circular target path while using the head internal to the disk drive to write the product servo sectors along the circular target path.

Figure 2A:
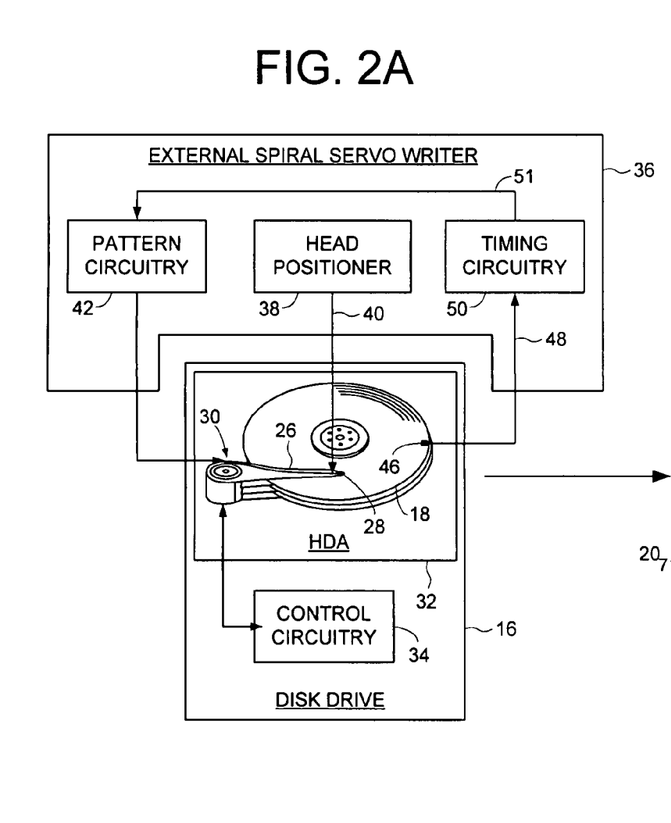
FIGS. 2A and 2B illustrate an embodiment of the present invention wherein an external spiral servo writer is used to write a plurality of spiral tracks to the disk, wherein the sync marks in the spiral tracks are modified at an initial radial location for use in locating an initial servo track.
Figure 2B:
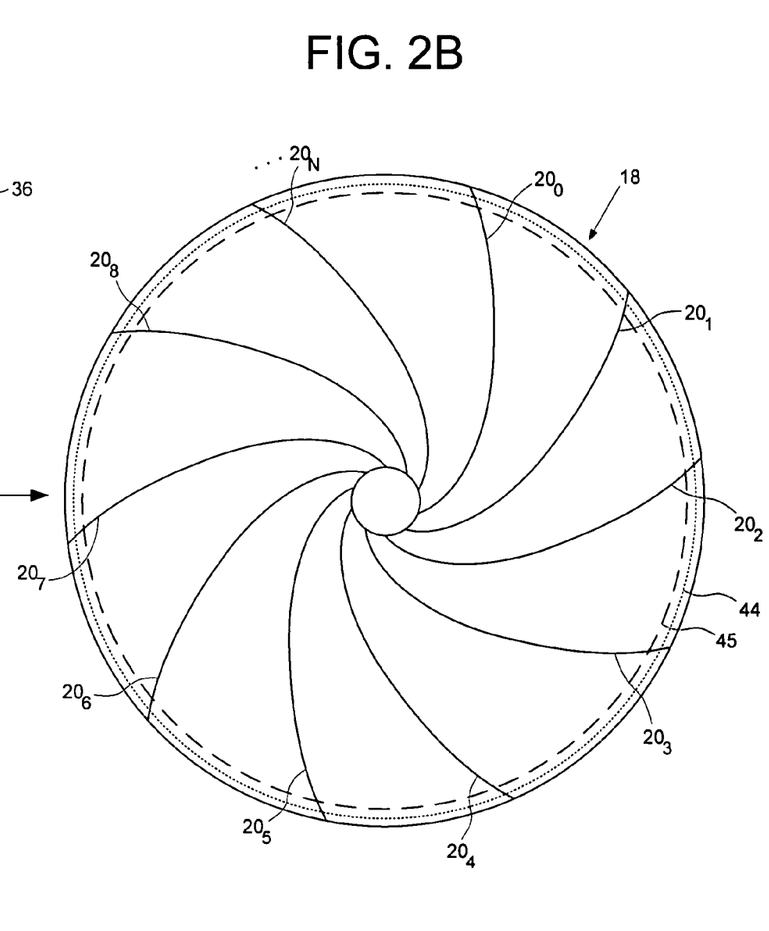

The spiral tracks may comprise any suitable pattern and may be written to the disk using any suitable technique, such as using an external writer for writing the spiral tracks to the disk, or stamping the spiral tracks on the disk using magnetic printing techniques. FIGS. 2A and 2B show an embodiment wherein a plurality of spiral tracks $20_0$-$20_N$ are written to a disk 18 of a disk drive 16 using an external spiral servo writer 36. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$-$20_N$ are written on the disk 18 at a predetermined circular location determined from the write clock. Each spiral track $20_i$ comprises a high frequency signal 22 (FIG. 4B) interrupted at a predetermined interval by a sync mark 24.

The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external spiral servo writer 36 inserts a clock head 46 into the HDA 32 for writing a clock track 44 (FIG. 2B) at an outer diameter of the disk 18.

The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables the servo write clock to maintain synchronization while writing the product servo sectors to the disk.

Referring again to FIG. 2B, while writing the spiral tracks $20_0$-$20_N$ at an initial radial location 45 an aberration is written in the sync marks 24 which allows the initial servo track to be located when writing the product servo sectors. Any suitable aberration in the sync marks 24 may be employed in the embodiments of the present invention, such as by disabling the pattern circuitry 42 so that one or more of the spiral tracks $20_0$-$20_N$ are not written at the initial radial location, or by writing a different sync mark in one or more of the spiral tracks $20_0$-$20_N$ at the initial radial location.

Figure 3:
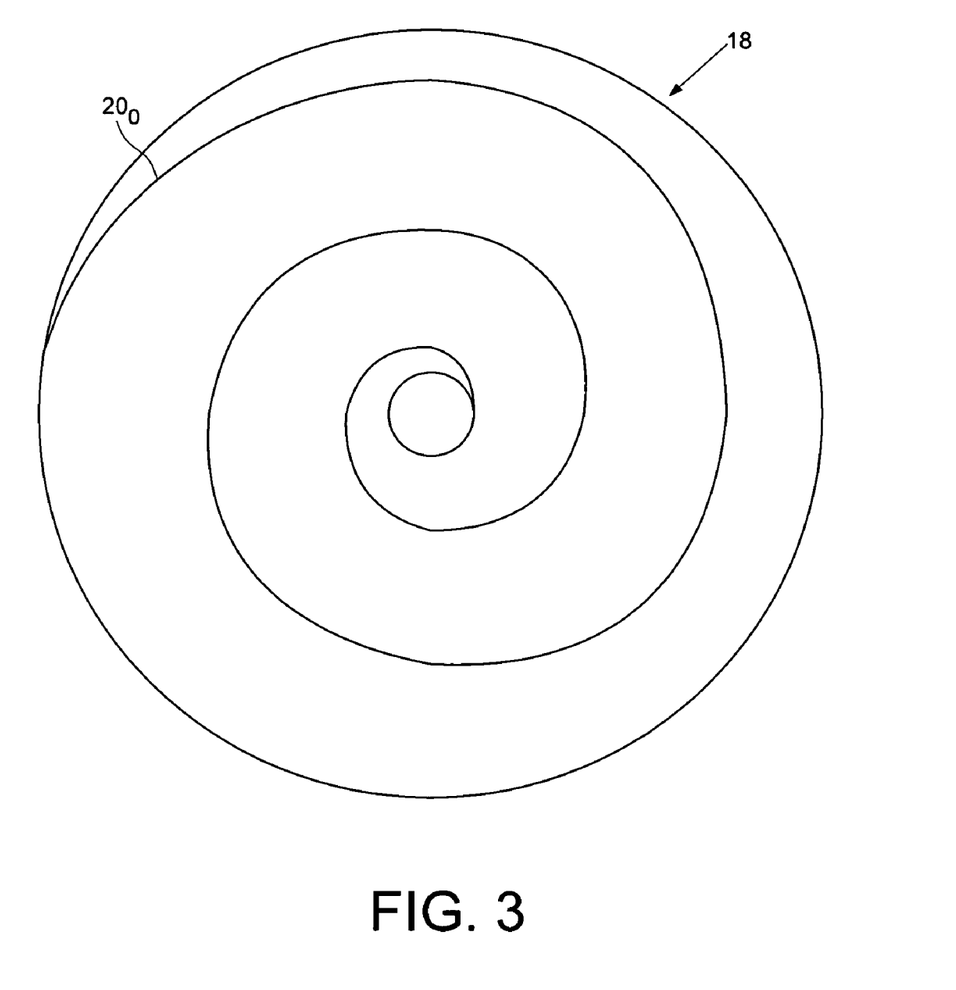
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment described below with reference to FIGS. 8 and 9, an external product servo writer is used to process the spiral tracks $20_0$-$20_N$ in order to write the product servo sectors to the disk 18 during a "fill operation".

Figure 4A:
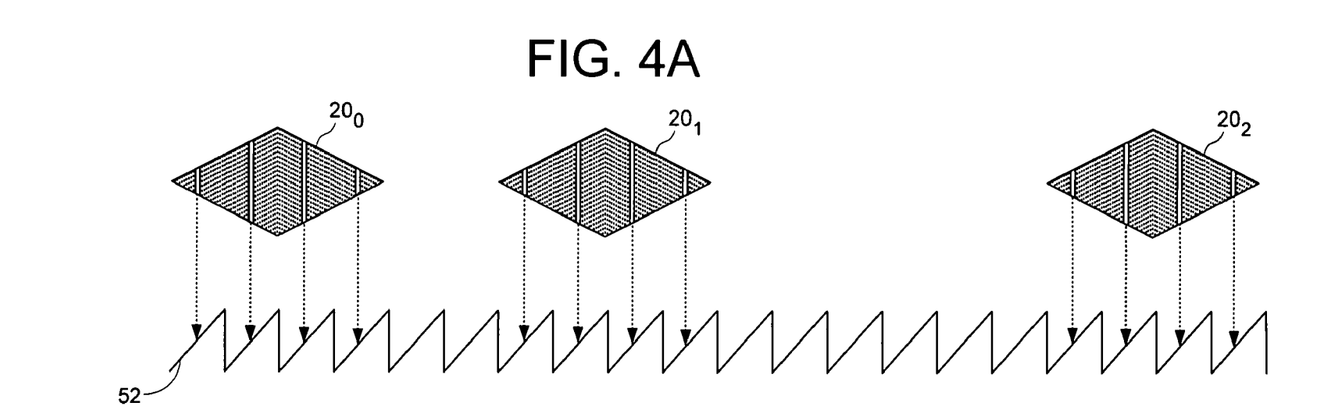
FIG. 4A shows an embodiment of the present invention wherein a servo write clock is synchronized by clocking a modulo-N counter relative to when the sync marks in the spiral tracks are detected.
Figure 4B:
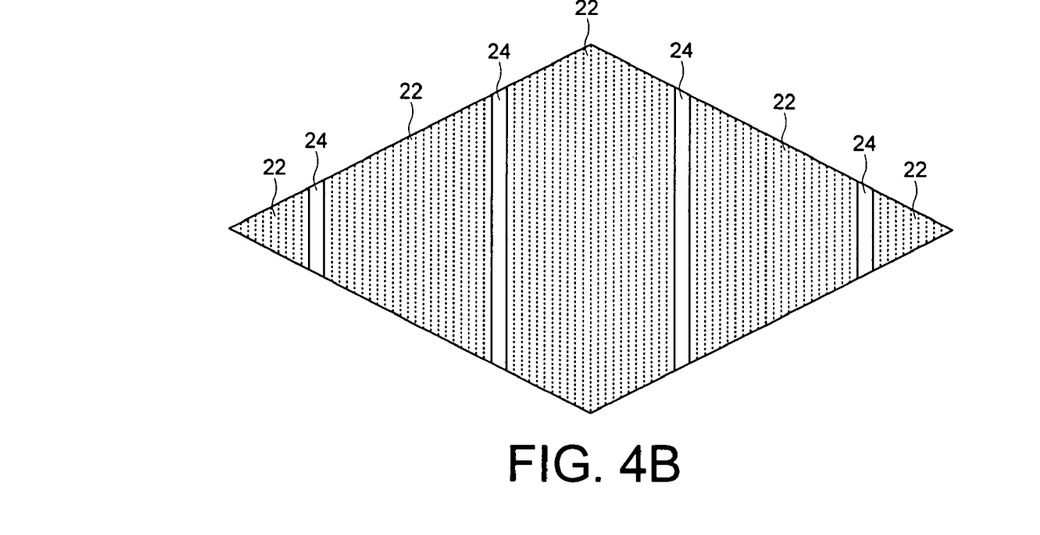
FIG. 4B shows an eye pattern generated by reading the spiral track, including the sync marks in the spiral track.

FIG. 4B illustrates an "eye" pattern in the read signal that is generated when the head 28 crosses over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL. In one embodiment, the PLL is updated when any one of the plurality of sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N count values, the servo write clock is coarsely locked to the desired frequency for writing the product servo sectors to the disk 18.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
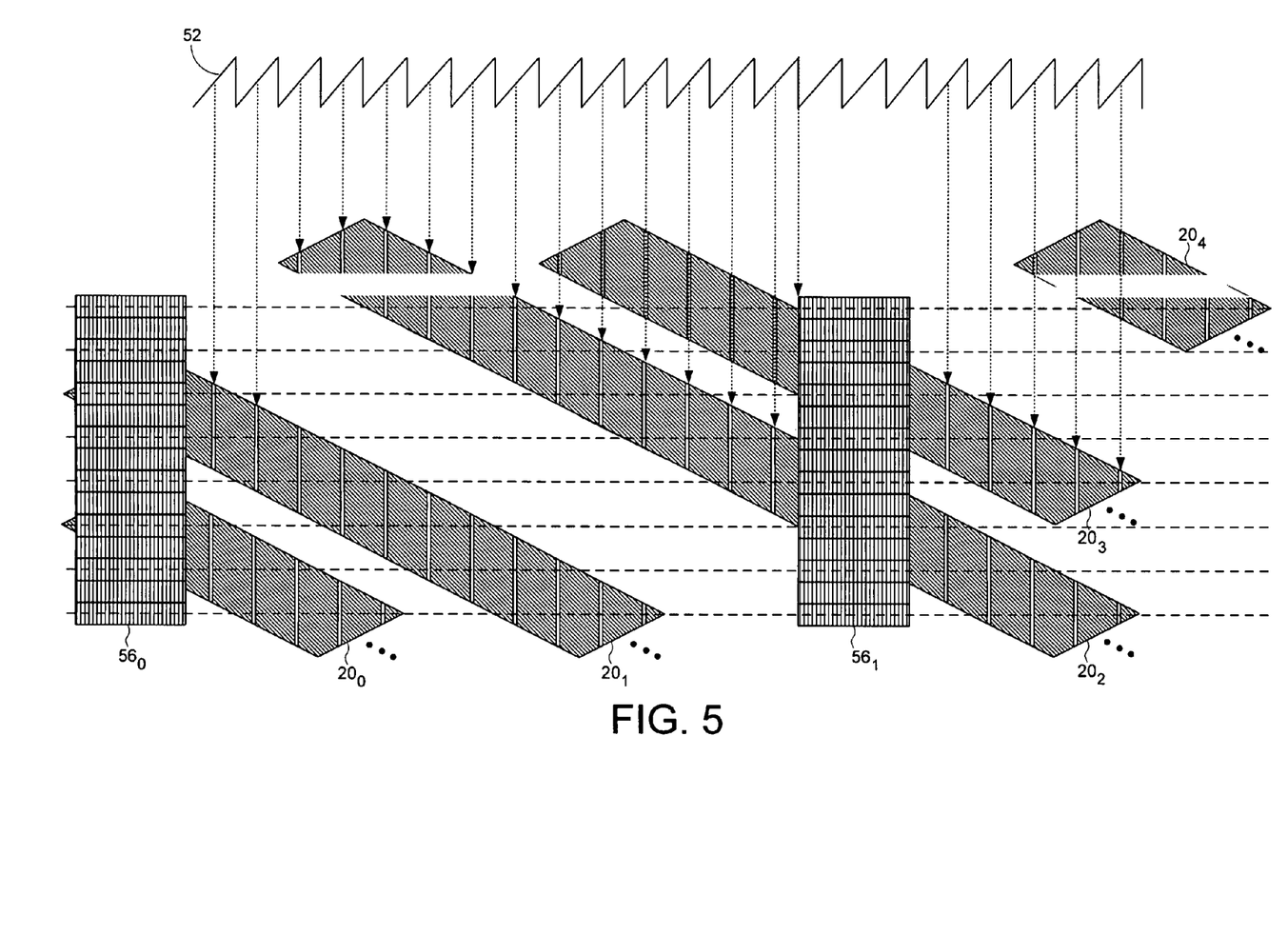
FIG. 5 illustrates writing of product servo sectors using a servo write clock generated from reading the spiral tracks, wherein every other spiral track is not written at the initial radial location for locating the initial servo track.

FIG. 5 illustrates how the product servo sectors $56_0$-$56_N$ are written to the disk 18 after synchronizing the servo write clock in response to the high frequency signal 22 and the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, each spiral track $20_0$-$20_N$ is wider than a data track, however, in an alternative embodiment the width of each spiral track $20_0$-$20_N$ is less than or proximate the width of a data track.

The PES for maintaining the head 28 along a servo track (tracking) may be generated from the spiral tracks $20_0$-$20_N$ in any suitable manner. In one embodiment, the PES is generated by detecting the eye pattern in FIG. 4B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Figure 6:
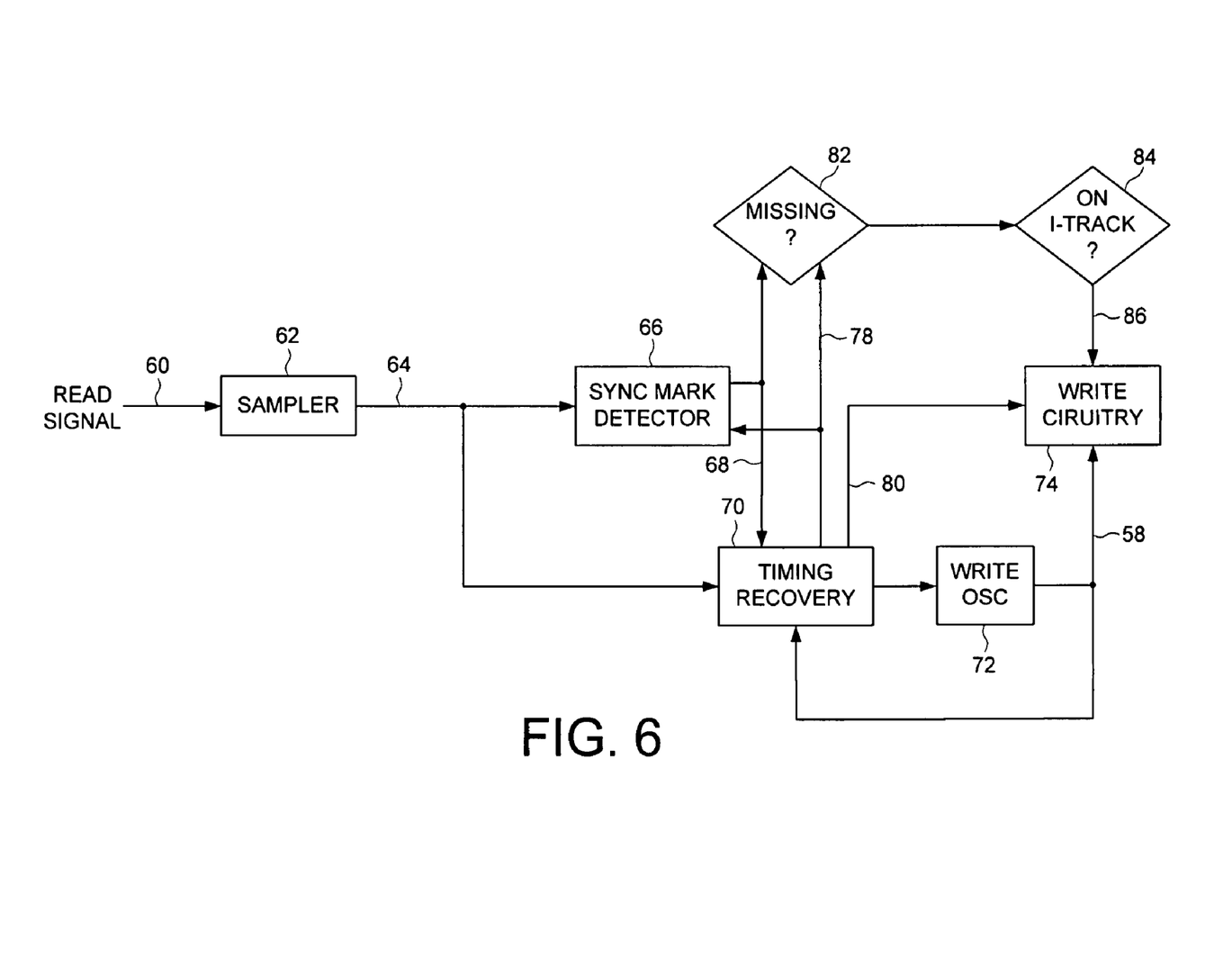
FIG. 6 shows circuitry according to an embodiment of the present invention for generating the servo write clock, and for detecting missing sync marks in the spiral tracks at the initial radial location.

FIG. 6 shows details of control circuitry for synchronizing the servo write clock 58 according to an embodiment of the present invention. The read signal 60 emanating from the head 28 is sampled 62, and the read signal sample values 64 are processed by a sync mark detector 66 for detecting the sync marks 24 in the spiral tracks $20_0$-$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_0$-$20_N$ to generate a fine timing recovery measurement. The coarse and fine timing recovery measurements are combined to generate a control signal applied to a write oscillator 72 which outputs the servo write clock 58. The servo write clock 58 clocks operation of write circuitry 74 for writing the product servo sectors $56_0$-$56_N$ to the disk 18. The servo write clock 58 is also fed back into the timing recovery circuit 70 and used to generate the coarse timing recovery measurement. The timing recovery circuit 70 generates a sync mark detection window over line 78 for enabling the sync mark detector 66 during a window where a sync mark 24 is expected to occur. The timing recovery circuit 70 also generates a control signal over line 80 to enable the write circuitry 74 to begin writing a product servo sector at the appropriate time.

Referring again to FIG. 5, when writing the product servo sectors $56_0$-$56_N$ an initial servo track is located relative to an aberration in the sync marks 24 of the spiral tracks at an initial radial location 45 (FIG. 2B). In the embodiment of FIG. 5, every other spiral track is missing (not written) so that the sync marks 24 are missing in every other spiral track. In other embodiments, there may be as few as one missing spiral track and corresponding missing sync mark. Referring again to FIG. 6, when the timing recovery circuit 70 enables the sync mark detector 66 over line 78 it also enables a missing sync mark detector 82 which detects the missing sync marks when the head is over the initial radial location 45. For example, the missing sync mark detector 82 may detect no sync mark detect signal 68 over the entire sync mark detection window. Once missing sync marks 24 are detected at every other spiral track, the initial radial location 45 is detected at step 84, and the write circuitry 74 is enabled over line 86 to begin writing the product servo sectors $56_0$-$56_N$ along the initial servo track as shown in FIG. 5.

Figure 7:
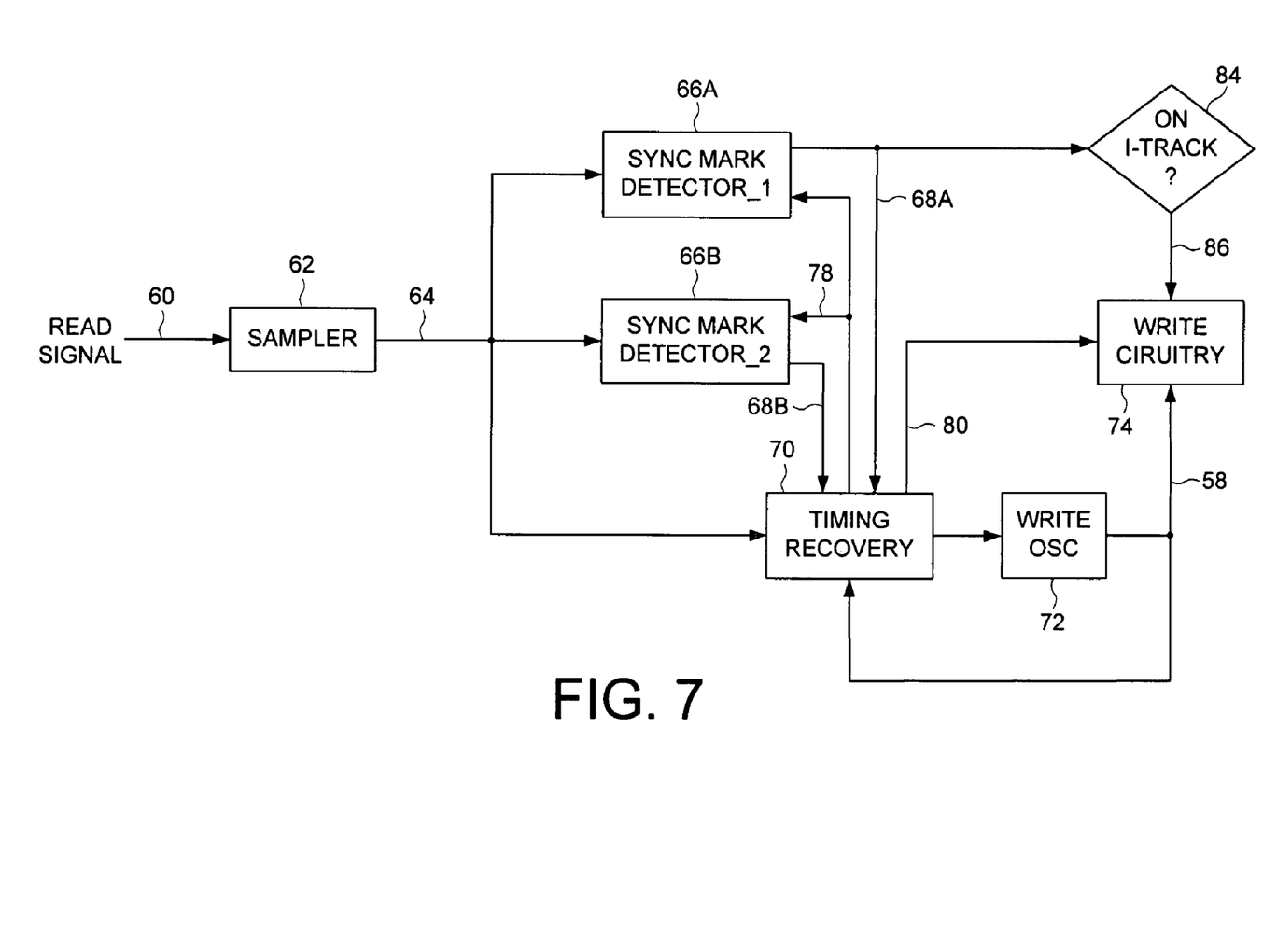
FIG. 7 shows circuitry according to an alternative embodiment of the present invention for generating the servo write clock, and for detecting different sync marks in the spiral tracks at the initial radial location.

Any suitable aberration may be detected at the initial radial location 45 for locating the initial servo track. In one embodiment, the sync marks 24 comprise a first pattern at the initial radial location 45, and the sync marks 24 comprise a second pattern at radial locations different than the initial radial location 45, wherein the first pattern is different than the second pattern. FIG. 7 shows corresponding control circuitry for synchronizing the servo write clock 58 as well as two sync mark detectors 66A and 66B for detecting the initial radial location 45. The first sync mark detector 66A generates a sync mark detect signal 68A when the first pattern is detected at the initial radial location 45. Once the first sync mark pattern is detected reliably and repeatedly, the initial radial location 45 is detected at step 84 and the write circuitry 74 is enabled over line 86 to begin writing the product servo sectors $56_0$-$56_N$ along the initial servo track. In one embodiment, only the sync marks 24 comprising the first pattern are written at the initial radial location 45, and in another embodiment a combination of sync marks 24 comprising the first and second patterns are written at the initial radial location 45 with as few as a single sync mark 24 comprising the first pattern written at the initial radial location 45. In the embodiment of FIG. 7, both sync mark detect signals 66A and 66B are used by the timing recovery circuitry 70 to synchronize the servo write clock 58.

Figure 8:
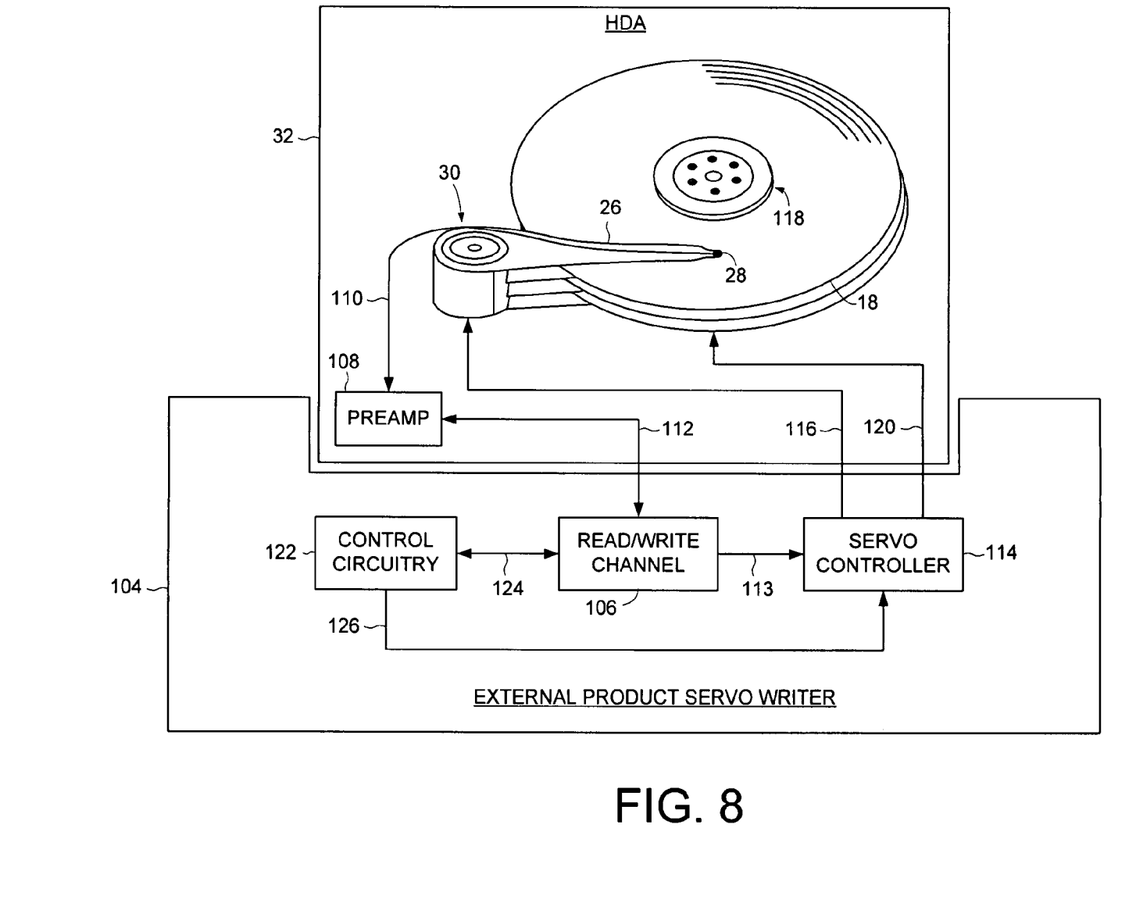
FIG. 8 shows an embodiment of the present invention wherein an external product servo writer is used to process the spiral tracks in order to write the product servo sectors to the disk.
Figure 9:
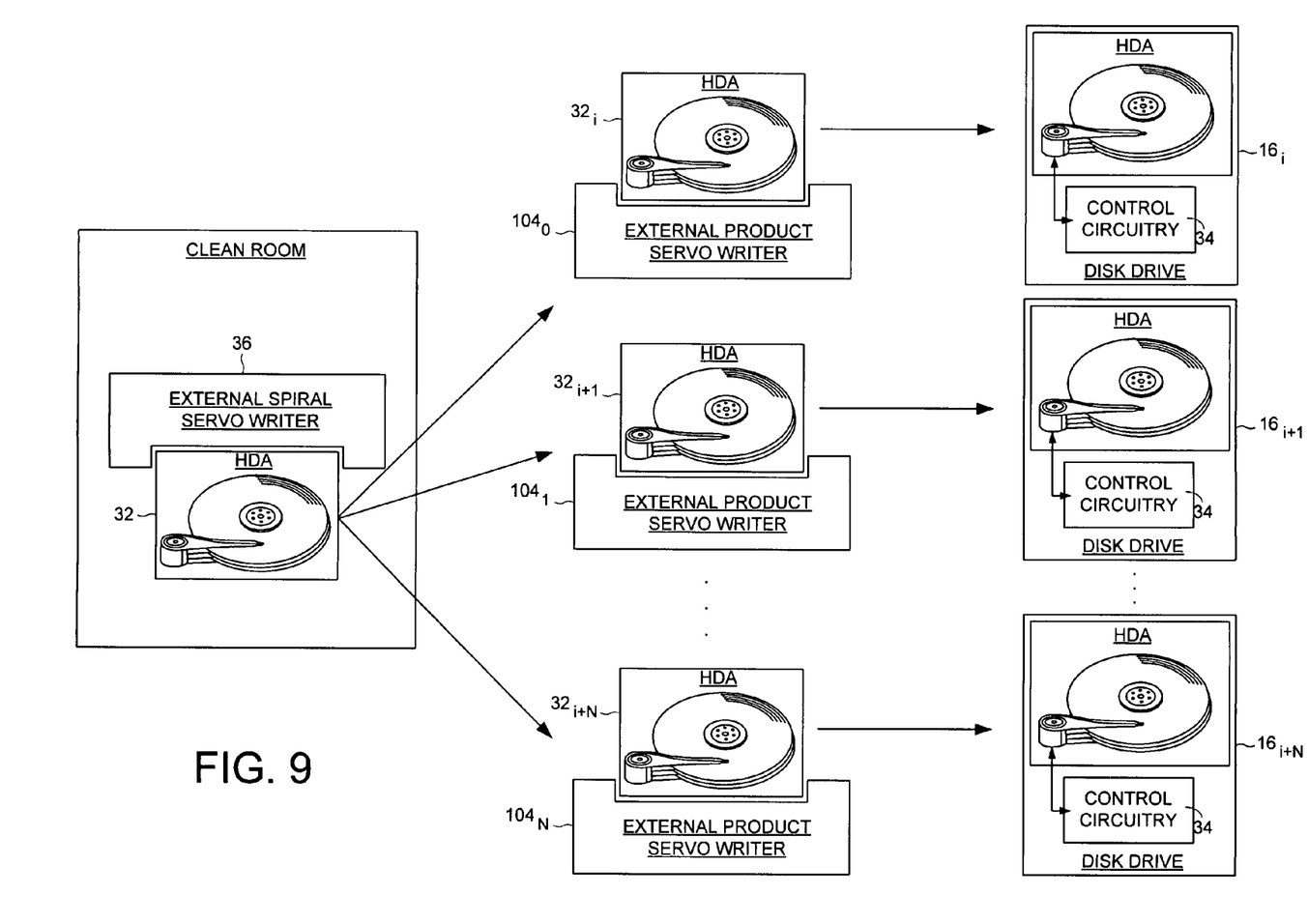
FIG. 9 shows an embodiment of the present invention wherein an external spiral servo writer is used to write the spiral tracks, and a plurality of external product servo writers write the product servo sectors for the HDAs output by the external spiral servo writer.

FIG. 8 shows an embodiment of the present invention wherein after writing the spiral tracks $20_0$-$20_N$ to the disk 18 (FIG. 2A-2B), the HDA 32 is inserted into an external product servo writer 104 comprising suitable circuitry for reading and processing the spiral tracks $20_0$-$20_N$ in order to write the product servo sectors $56_0$-$56_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo burst signals 113 applied to a servo controller 114. The servo controller 114 processes the servo burst signals 113 to generate the PES. The PES is processed to generate a VCM control signal applied to the VCM 30 over line 116 in order to maintain the head 28 along a circular path while writing the product servo sectors $56_0$-$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks $20_0$-$20_N$ (e.g., timing information) and provides the product servo sector data to the read/write channel 106 at the appropriate time. The product servo sector data is provided to the preamp 108 which modulates a current in the head 28 in order to write the product servo sectors $56_0$-$56_N$ to the disk 18. The control circuitry 122 also transmits control information over line 126 to the servo controller 114 such as the target servo track to be written. After writing the product servo sectors $56_0$-$56_N$ to the disk 18, the HDA 32 is removed from the external product servo writer 104 and a printed circuit board assembly (PCBA) comprising the control circuitry 34 (FIG. 2A) is mounted to the HDA 32.

Figure 10:
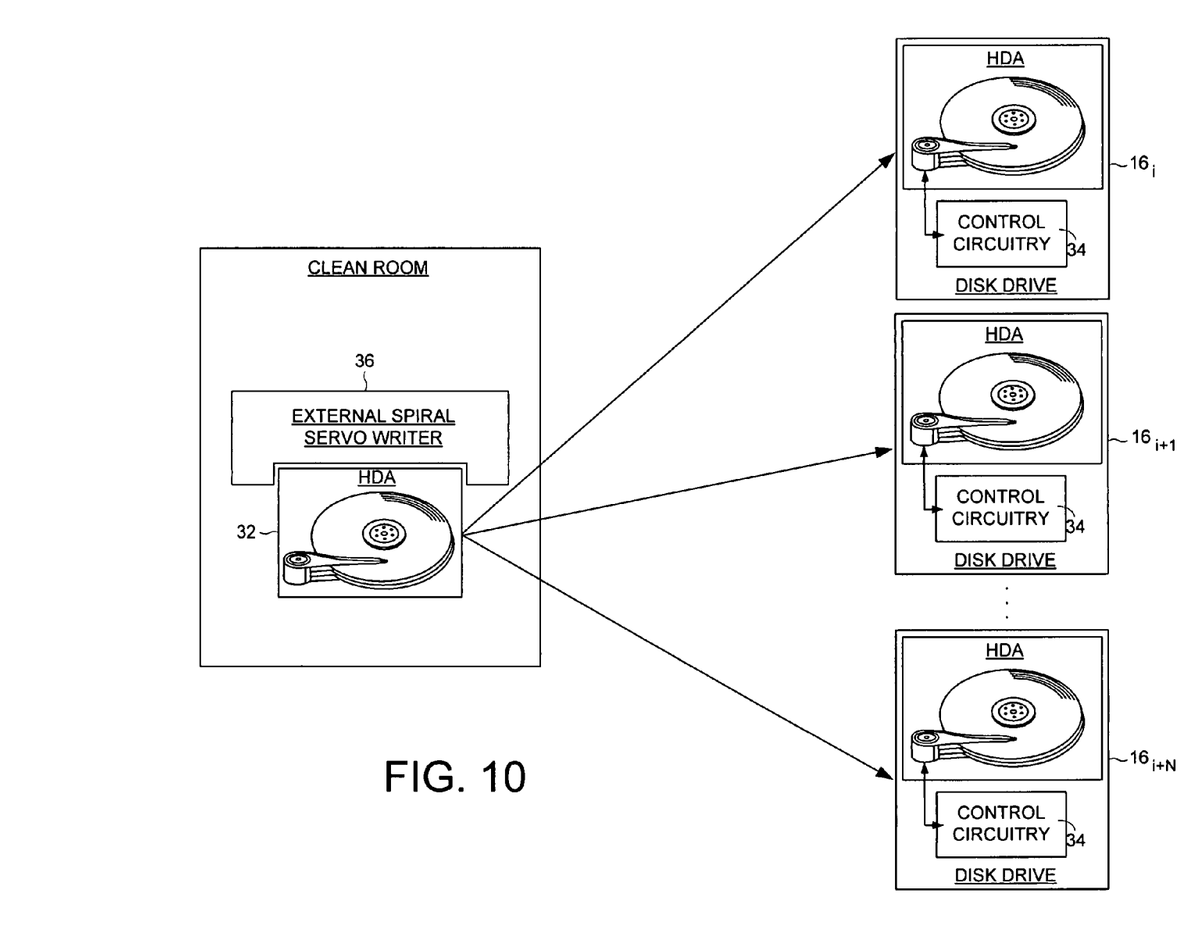
FIG. 10 shows an embodiment of the present invention wherein an external spiral servo writer is used to write the spiral tracks, and the control circuitry within each product disk drive is used to write the product servo sectors.

In one embodiment, the external product servo writer 104 of FIG. 8 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 9, a plurality of external product servo writers $104_0$-$104_N$ process the HDAs $32_{i-i+N}$ output by an external spiral servo writer 36 in order to write the product servo sectors less expensively and more efficiently than a conventional servo writer. In an alternative embodiment shown in FIG. 10, an external spiral servo writer 36 or an external media writer is used to write the spiral tracks, and the control circuitry 34 within each product disk drive $16_i$-$16_{i-i+N}$ is used to write the product servo sectors.

We claim:

1. A method of writing product servo sectors to a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the disk comprising a plurality of spiral tracks, wherein each spiral track comprises a high frequency signal interrupted at a predetermined interval by a sync mark, the method comprising:

using the head internal to the disk drive to read the spiral tracks to generate a read signal;

processing the read signal to detect the sync marks in the spiral tracks;

detecting an aberration in the detected sync marks in order to locate an initial radial location of the head with respect to the disk;

processing the read signal representing the high frequency signal in the spiral tracks to generate a position error signal (PES) used to maintain the head along a substantially circular target path; and using the head internal to the disk drive to write the product servo sectors along the circular target path.

2. The method as recited in claim 1, wherein at least one of the spiral tracks is missing at least one sync mark at the initial radial location.

3. The method as recited in claim 2, wherein every other spiral track is missing at least one sync mark at the initial radial location.

4. The method as recited in claim 1, wherein:

the sync marks comprise a first pattern at the initial radial location; and the sync marks comprise a second pattern at radial locations different than the initial radial location, wherein the first pattern is different than the second pattern.

5. The method as recited in claim 4, wherein detecting the sync marks comprises detecting the first pattern at the initial radial location and detecting the second pattern at radial locations different than the initial radial location.

6. A disk drive comprising:

(a) a disk comprising a plurality of spiral tracks, wherein each spiral track comprises a high frequency signal interrupted at a predetermined interval by a sync mark;

(b) an actuator arm;

(c) a head connected to a distal end of the actuator arm;

(d) a voice coil motor for rotating the actuator arm about a pivot to position the head radially over the disk; and (e) control circuitry operable to write a plurality of product servo sectors to the disk to define a plurality of radially spaced, concentric data tracks by:

using the head internal to the disk drive to read the spiral tracks to generate a read signal;

processing the read signal to detect the sync marks in the spiral tracks;

detecting an aberration in the detected sync marks in order to locate an initial radial location of the head with respect to the disk;

processing the read signal representing the high frequency signal in the spiral tracks to generate a position error signal (PES) used to maintain the head along a substantially circular target path; and using the head internal to the disk drive to write the product servo sectors along the circular target path.

7. The disk drive as recited in claim 6, wherein at least one of the spiral tracks is missing at least one sync mark at the initial radial location.

8. The disk drive as recited in claim 7, wherein every other spiral track is missing at least one sync mark at the initial radial location.

9. The disk drive as recited in claim 6, wherein:

the sync marks comprise a first pattern at the initial radial location; and the sync marks comprise a second pattern at radial locations different than the initial radial location, wherein the first pattern is different than the second pattern.

10. The disk drive as recited in claim 9, wherein detecting the sync marks comprises detecting the first pattern at the initial radial location and detecting the second pattern at radial locations different than the initial radial location.

* * * * *

UNITED STATES PATENT AND TRADEMARK OFFICE
CERTIFICATE OF CORRECTION

PATENT NO. : 7,457,071 B1 Page 1 of 1
APPLICATION NO. : 11/500568
DATED : November 25, 2008
INVENTOR(S) : Edgar D. Sheh and Yilin Cai It is certified that error appears in the above-identified patent and that said Letters Patent is hereby corrected as shown below:

Title Page, Item (75) Inventors:
After "Edgar D. Sheh, San Jose, CA (US)", insert -- Yilin Cai, Fremont, CA (US) --.

Signed and Sealed this

Sixteenth Day of March, 2010

David J. Kappos
*Director of the United States Patent and Trademark Office*